United States Patent
Skaff et al.

(10) Patent No.: US 12,524,734 B2
(45) Date of Patent: Jan. 13, 2026

(54) DATA REDUCTION IN A BAR CODE READING ROBOT SHELF MONITORING SYSTEM

(71) Applicant: SHANGHAI HANSHI INFORMATION TECHNOLOGY CO., LTD., Shanghai (CN)

(72) Inventors: Sarjoun Skaff, Pittsburgh, PA (US); Stephen Vincent Williams, Pittsburgh, PA (US)

(73) Assignee: SHANGHAI HANSHI INFORMATION TECHNOLOGY CO., LTD., Shanghai (CN)

( * ) Notice: Subject to any disclaimer, the term of this patent is extended or adjusted under 35 U.S.C. 154(b) by 1521 days.

(21) Appl. No.: 16/044,178

(22) Filed: Jul. 24, 2018

(65) Prior Publication Data

US 2019/0034864 A1  Jan. 31, 2019

Related U.S. Application Data

(60) Provisional application No. 62/536,793, filed on Jul. 25, 2017.

(51) Int. Cl.
| | |
|---|---|
| *G06Q 10/087* | (2023.01) |
| *G06K 7/14* | (2006.01) |
| *H04N 23/50* | (2023.01) |
| *H04N 23/695* | (2023.01) |
| *H04N 23/698* | (2023.01) |

(52) U.S. Cl.
CPC ......... *G06Q 10/087* (2013.01); *G06K 7/1413* (2013.01); *H04N 23/50* (2023.01); *H04N 23/695* (2023.01); *H04N 23/698* (2023.01)

(58) Field of Classification Search
CPC .... G06Q 10/087; G06K 7/1413; H04N 23/50; H04N 23/695; H04N 23/698
USPC .......................................................... 235/385
See application file for complete search history.

(56) References Cited

U.S. PATENT DOCUMENTS

| | | | | |
|---|---|---|---|---|
| 2008/0063287 | A1* | 3/2008 | Klamer | G11B 27/329 382/232 |
| 2009/0060259 | A1* | 3/2009 | Goncalves | A47F 9/047 382/100 |
| 2012/0293607 | A1* | 11/2012 | Bhogal | G06T 3/4038 348/E5.051 |
| 2015/0055855 | A1 | 2/2015 | Rodriguez et al. | |
| 2015/0117788 | A1 | 4/2015 | Patel et al. | |
| 2015/0235157 | A1 | 8/2015 | Avegliano et al. | |
| 2015/0262116 | A1 | 9/2015 | Katircioglu | |
| 2016/0027159 | A1 | 1/2016 | Amirghodsi et al. | |
| 2016/0171429 | A1* | 6/2016 | Schwartz | G06T 7/90 382/103 |

(Continued)

*Primary Examiner* — Thien M Le
*Assistant Examiner* — Tae W Kim
(74) *Attorney, Agent, or Firm* — Arch & Lake LLP

(57) ABSTRACT

A method for greatly reducing data storage requirements of autonomous robots capable of product inventory is described. Instead using high resolution images for label identification and position tracking, a lower resolution map can be searched. Human or machines can identify position of labels, and via a reverse mapping, the corresponding position of a label on the high resolution image can be identified. Except for those portions of the high resolution image showing a label, most of the high resolution image can be discarded. Further processing on the limited image subset can be used to read the labels.

20 Claims, 11 Drawing Sheets

(56) References Cited

U.S. PATENT DOCUMENTS

2016/0171707 A1 6/2016 Schwartz
2017/0032311 A1* 2/2017 Rizzolo .................. G06V 10/25
2017/0178060 A1 6/2017 Schwartz
2017/0193430 A1 7/2017 Barreraaveglano et al.

* cited by examiner

DATA REDUCTION IN A BAR CODE READING ROBOT SHELF MONITORING SYSTEM

RELATED APPLICATION

This application claims the benefit of U.S. Provisional Application Ser. No. 62/536,793, filed Jul. 25, 2017, which is incorporated herein by reference for all purposes.

TECHNICAL FIELD

The present disclosure relates generally to a multiple camera sensor suite capable of accurately monitoring retail or warehouse product. In certain embodiments, the multiple camera sensor suite can be mounted on an autonomous robot and include onboard processing to provide near real time product tracking.

BACKGROUND

Retail stores or warehouses can have thousands of distinct products that are often sold, removed, added, or repositioned. Even with frequent restocking schedules, products assumed to be in stock may be out of stock, decreasing both sales and customer satisfaction. Point of sales data can be used to roughly estimate product availability, but does not help with identifying misplaced, stolen, or damaged products, all of which can reduce product availability. However, manually monitoring product inventory and tracking product position is expensive and time consuming.

One solution for tracking product inventory relies on planograms (lists or diagrams that show how and where specific products should be placed on shelves or displays) in combination with machine vision technology. Given a planogram, machine vision can be used to assist in shelf space compliance. For example, large numbers of fixed position cameras can be used throughout a store to monitor aisles, with large gaps in shelf space being checkable against the planogram or shelf labels, and flagged as "out of stock" if necessary. Alternatively, a smaller number of movable cameras can be used to scan a store aisle. Even with such systems, human intervention is generally required to build an initial planogram that includes detailed information relative to a bounding box that can include product identification, placement, and count. Substantial human intervention can also be required to update the planogram, as well as search for misplaced product inventory.

SUMMARY

A low cost, accurate, and scalable camera system for product or other inventory monitoring can include a movable base. Multiple cameras supported by the movable base are directable toward shelves or other systems for holding products or inventory. A processing module is connected to the multiple cameras and able to construct from the camera derived images an updateable map of product or inventory position.

In some embodiments, the described camera system for inventory monitoring can be used for detecting shelf labels; optionally comparing shelf labels to a depth map; defining a product bounding box; associating the bounding box to a shelf label to build a training data set; and using the training data set to train a product classifier.

In other embodiments, a system for building a product library can include an image capture unit operated to provide images of items. The system also includes a shelf label detector (which can be a high resolution zoomable camera) and optionally depth map creation unit (which can be provided by laser scanning, time-of-flight range sensing, or stereo imaging), a processing module to optionally compare detected shelf labels to a depth map, define a product bounding box, and associate the bounding box with a shelf label to build a training data set or learn image descriptors. Both the image capture unit and processing module can be mounted on an autonomous robot.

Because it represents reality on the shelf, an inventory map such as disclosed herein can be known as a "realogram" to distinguish from conventional planograms. Realograms can be locally stored with a data storage module connected to the processing module. A communication module can be connected to the processing module to transfer realogram data to remote locations, including servers or other supported camera systems, and optionally receive inventory information including planograms to aid in realogram construction. In addition to realogram mapping, this system can be used to detect out of stock products, estimate depleted products, estimate amount of products including in stacked piles, estimate products heights, lengths and widths, build 3D models of products, determine products' positions and orientations, determine whether one or more products are in disorganized on-shelf presentation that requires corrective action such as facing or zoning operations, estimate freshness of products such as produce, estimate quality of products including packaging integrity, locate products, including at home locations, secondary locations, top stock, bottom stock, and in the backroom, detect a misplaced product event (also known as a plug), identify misplaced products, estimate or count the number of product facings, compare the number of product facings to the planogram, locate labels, determine sequence of labels, detect label type, read label content, including product name, barcode, UPC code and pricing, detect missing labels, compare label locations to the planogram, compare product locations to the planogram, determine the expiration date of products, determine freshness of products including produce, measure shelf height, shelf depth, shelf width and section width, recognize signage, detect promotional material, including displays, signage, and features and measure their bring up and down times, detect and recognize seasonal and promotional products and displays such as product islands and features, capture images of individual products and groups of products and fixtures such as entire aisles, shelf sections, specific products on an aisle, and product displays and islands, capture 360-deg and spherical views of the environment to be visualized in a virtual tour application allowing for virtual walk throughs, capture 3D images of the environment to be viewed in augmented or virtual reality, capture environmental conditions including ambient light levels, capture information about the environment including measuring space compliance with disability and safety standards and determining if light bulbs are off, provide a real-time video feed of the space to remote monitors, provide on-demand images and videos of specific locations, including in live or scheduled settings, and build a library of product images.

In one embodiment, the movable base can be a manually pushed or guidable cart. Alternatively, the movable base can be a tele-operated robot, or in preferred embodiments, an autonomous robot capable of guiding itself through a store or warehouse. Depending on size of the store or warehouse, multiple autonomous robots can be used. Aisles can be regularly inspected to identify out of stocks or create realograms, with aisles having high product movement or high value being inspected more often.

In another embodiment, an inventory monitoring method includes the steps of allowing an autonomous robot to move along an aisle that is lined with shelves capable of holding inventory or products, with the autonomous robot acting as a movable base for multiple cameras. Multiple cameras are directed toward inventory on the shelf lined aisle, with data derived at least in part from these cameras being used to construct a realogram of inventory or a panoramic image using a processing module contained in the autonomous robot. Realogram data or panoramic images created by the processing module can be transferred to remote locations using a communication module, and inventory information received via the communication module can be used to aid in realogram construction.

In yet another embodiment, an inventory monitoring method, includes the steps of allowing an autonomous robot to move along a shelf lined aisle holding inventory, with the autonomous robot acting as a movable base for multiple cameras. The autonomous robot can maintain a substantially constant or tightly controlled distance from the shelf lined aisle holding inventory while moving in a forward or reverse direction. Using the multiple cameras directed toward inventory on the shelf lined aisle, at least part of a realogram of inventory positioned along a shelf lined aisle holding inventory can be constructed. Typically, the realogram is created and updated with a locally sited data storage and a processing module contained in the autonomous robot. To ensure complete or near complete camera coverage of shelf lined aisles, the autonomous robot can pause, reverse, or mark for further multiple camera inspection if data capture for a portion of the shelf lined aisle is incomplete.

To improve data handling speed and efficiency, use of various image processing techniques for handling product related data are possible. For example, an autonomous robot can be directed or allowed to move along the aisle comprising product, product labels, and shelf associated stock labels, with the autonomous robot acting as a movable base having multiple cameras for image capture, and depth sensors useful for detecting shelf edges. A first set of high resolution images of an aisle comprising product, product labels, and shelf associated stock labels is captured. A second set of images derived from the first set of images and having a lower resolution than the first set of images is then created. Resolution is selected so that product images are viewable, and have sufficient details to allow for automated or manual identification of the products. A third set of images that are a subset of the first set of images is also preserved. This third set of images has a higher resolution than the second set of images, and resolution is selected so that product labels and shelf associated stock labels are readable by automated or manual systems.

Advantageously, the foregoing described method and various embodiments allows for greatly reduced data storage requirements. Instead of having to process high resolution images, a lower resolution panorama can be analyzed. Human or machines can identify position of labels, and via a reverse mapping, the corresponding position of a label on the high resolution image can be identified. Except for those portions of the high resolution image showing a label, most of the high resolution image can be discarded. Further processing on the limited image subset can be used to read the labels. Typically, this provides a ten-fold or greater data reduction for the high resolution image.

DETAILED DESCRIPTION

Figure 1:
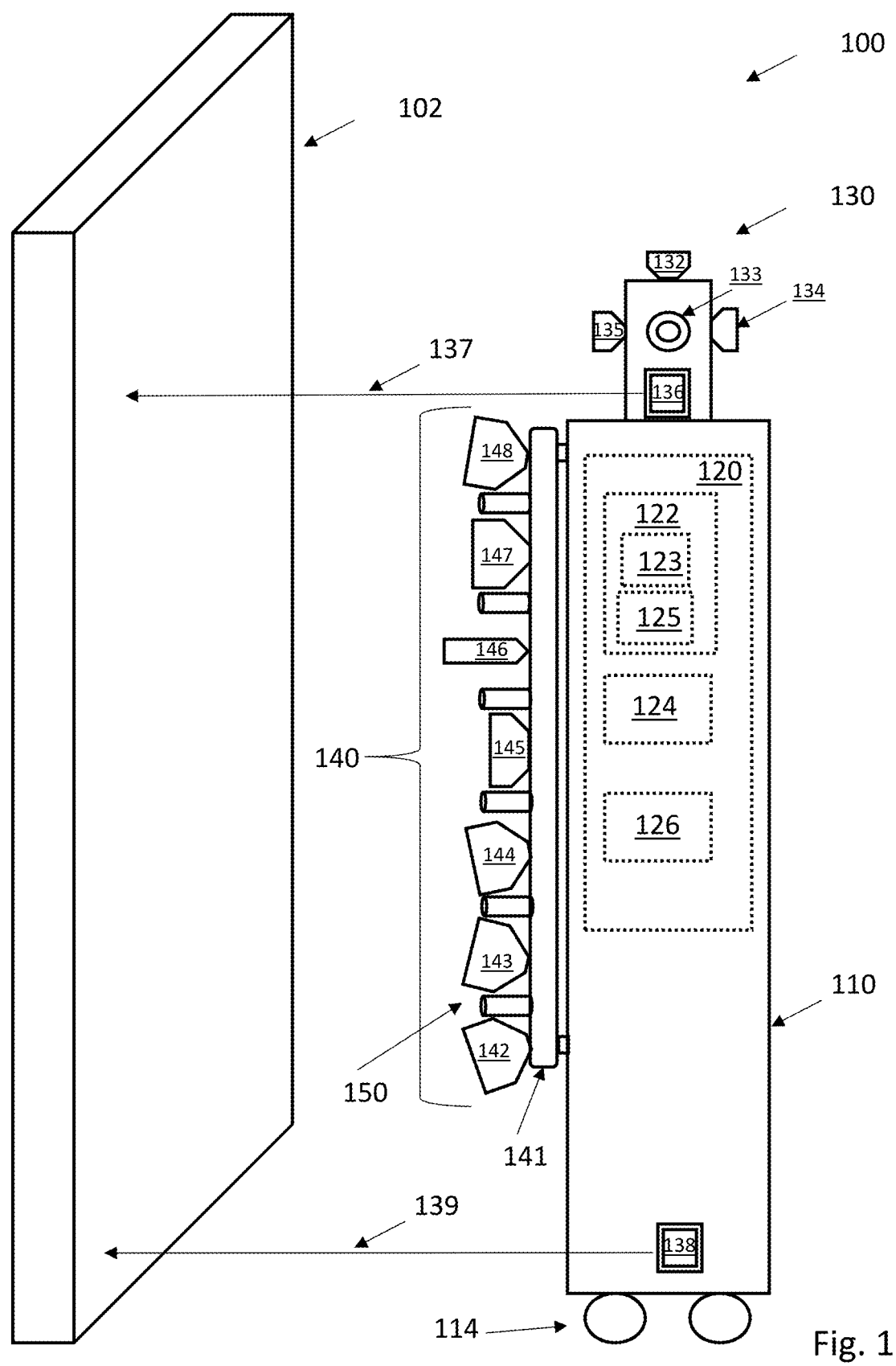
FIG. 1 is an illustration of a camera system mounted on a movable base to track product changes in aisle shelves or other suitable targets.

FIG. 1 is an illustration of an inventory monitoring camera system 100 mounted on a movable base 110 (with drive wheels 114) to track product changes in aisle shelves or other targets 102 without requiring an initial planogram.

The movable base 110 can be an autonomous robot having a navigation and object detection sensor suite 130 that is capable of independently navigating and moving throughout a building. The autonomous robot has multiple cameras 140 attached to movable base 110 by a vertically extending camera support 140. Lights 150 are positioned to direct light toward target 102. The object sensing suite includes forward (133), side (134 and 135), top (132) and/or rear (not shown) image and depth sensors to aid in object detection, localization, and navigation. Additional sensors such as laser ranging units 136 and 138 (and respective laser scanning beams 137 and 139) also form a part of the sensor suite that is useful for accurate distance determination. In certain embodiments, image sensors can be depth sensors that infer depth from radar, stereo images, project an infrared mesh overlay that allows rough determination of object distance in an image, or that infer depth from the time of flight of light reflecting off the target. In other embodiments, simple cameras and various image processing algorithms for identifying object position and location can be used. For selected applications, ultrasonic sensors, radar systems, magnetometers or the like can be used to aid in navigation. In still other embodiments, sensors capable of detecting electromagnetic, light, or other location beacons can be useful for precise positioning of the autonomous robot.

As seen in FIG. 1, various representative camera types useful for constructing an updatable realogram are shown. As previously noted, a realogram can use camera derived images to produce an updateable map of product or inventory position. Typically, one or more shelf units (e.g. target 102) would be imaged by a diverse set of camera types, including downwardly (142 and 144) or upwardly (143 and 148) fixed focal length cameras that cover a defined field less than the whole of a target shelf unit; a variable focus camera that adapts its focus to the distance from the imaged target; a wide field camera 145 to provide greater photographic coverage than the fixed focal length cameras; and a narrow field, zoomable telephoto 146 to capture bar codes, product identification numbers, and shelf labels. Alternatively, a high resolution, tilt controllable, height adjustable camera can be used to identify shelf labels. These camera 140 derived images can be stitched together, with products in the images identified, and position determined.

To simplify image processing and provide accurate results, the multiple cameras are typically positioned a set distance from the shelves during the inspection process. The shelves can be illuminated with LED or other directable lights 150 positioned on or near the cameras. The multiple cameras can be linearly mounted in vertical, horizontal, or other suitable orientation on a camera support. In some embodiments, to reduce costs, multiple cameras are fixedly mounted on a camera support. Such cameras can be arranged to point upward, downward, or level with respect to the camera support and the shelves. This advantageously permits a reduction in glare from products having highly reflective surfaces, since multiple cameras pointed in slightly different directions can result in at least one image with little or no glare.

Electronic control unit 120 contains an autonomous robot sensing and navigation control module 124 that manages robot responses. Robot position localization may utilize external markers and fiducials, or rely solely on localization information provided by robot-mounted sensors. Sensors for position determination include previously noted imaging, optical, ultrasonic sonar, radar, Lidar, Time of Flight, structured light, or other means of measuring distance between the robot and the environment, or incremental distance traveled by the mobile base, using techniques that include but are not limited to triangulation, visual flow, visual odometry and wheel odometry.

Electronic control unit 120 also provides image processing using a camera control and data processing module 122. Autonomous robot sensing and navigation control module 124 manages robot responses, and communication module 126 manages data input and output. The camera control and data processing module 122 can include a separate data storage module 123 (e.g. solid state hard drives) connected to a processing module 125. The communication module 126 is connected to the processing module 125 to transfer realogram data or panoramic images to remote locations, including store servers or other supported camera systems, and additionally receive inventory information to aid in realogram construction. In certain embodiments, realogram data is primarily stored and images are processed within the autonomous robot. Advantageously, this reduces data transfer requirements, and permits operation even when local or cloud servers are not available.

Figure 2:
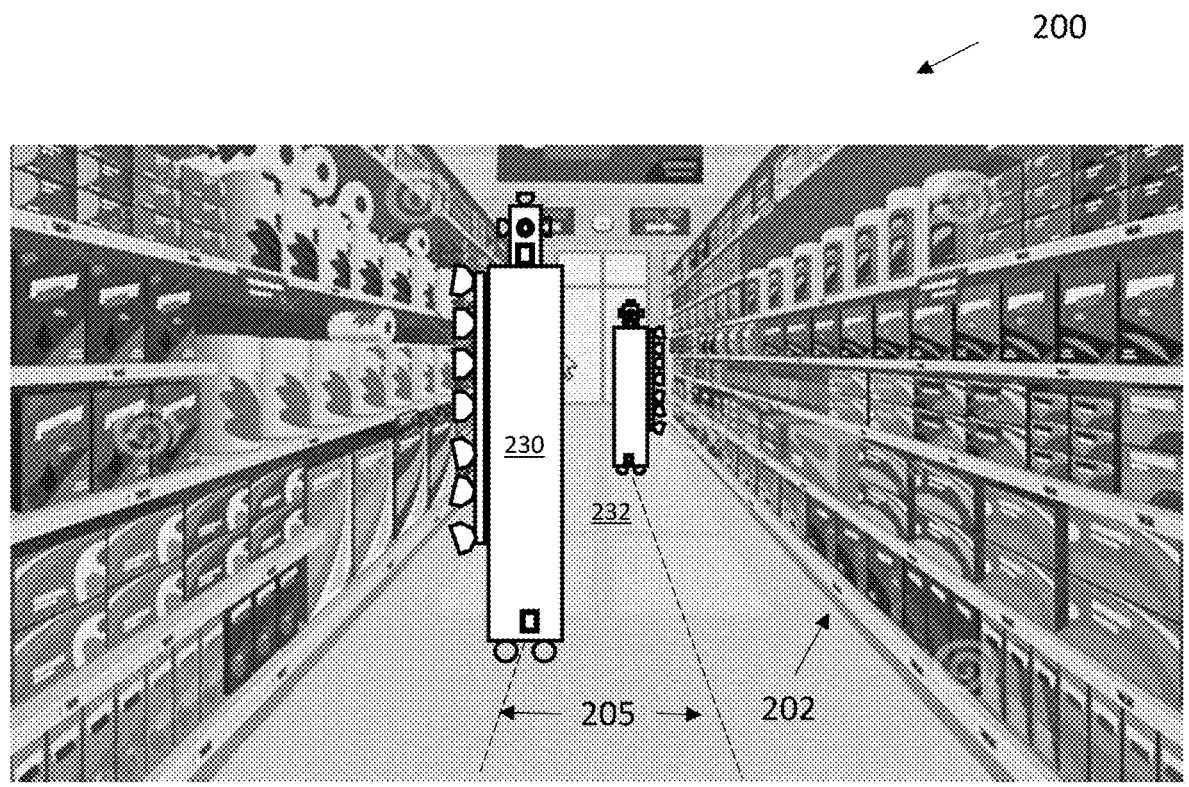
FIG. 2 is a cartoon illustrating two autonomous robots inspecting opposite shelves in an aisle.

FIG. 2 is a cartoon 200 illustrating two autonomous robots 230 and 232, similar to that discussed with respect to FIG. 1, inspecting opposite shelves 202 in an aisle. As shown each robot follows path 205 along the length of an aisle, with multiple cameras capturing images of the shelves 202.

In some embodiments, the robots 230 and 232 support at least one range finding sensor to measure distance between the multiple cameras and the shelves and products on shelves, with an accuracy of less than 5 cm, and with a typical accuracy range between about 5 cm and 1 mm. As will be appreciated, LIDAR or other range sensing instruments with similar accuracy can also be used in selected applications. Using absolute location sensors, relative distance measurements to the shelves, triangulation to a known landmark, conventional simultaneous localization and mapping (SLAM) methodologies, or relying on beacons positioned at known locations in a blueprint or a previously built map, the robots 230 and 232 can move along a path generally parallel to shelves 202. As the robots move, vertically positioned cameras are synchronized to simultaneously capture images of the shelves 202. In certain embodiments, a depth map of the shelves and products is created by measuring distances from the shelf cameras to the shelves and products over the length of the shelving unit using depth sensors and or laser ranging instrumentation. The depth map is registered onto the images captured by the shelf cameras, so as the location of each pixel on target can be estimated in 3D. Using available information, consecutive images can be stitched together to create panoramic images that spans an entire shelving unit. The consecutive images can be first stitched vertically among all the cameras, and then horizontally and incrementally stitched with each new consecutive set of vertical images as the robots 230 and 232 move along an aisle.

Figure 3:
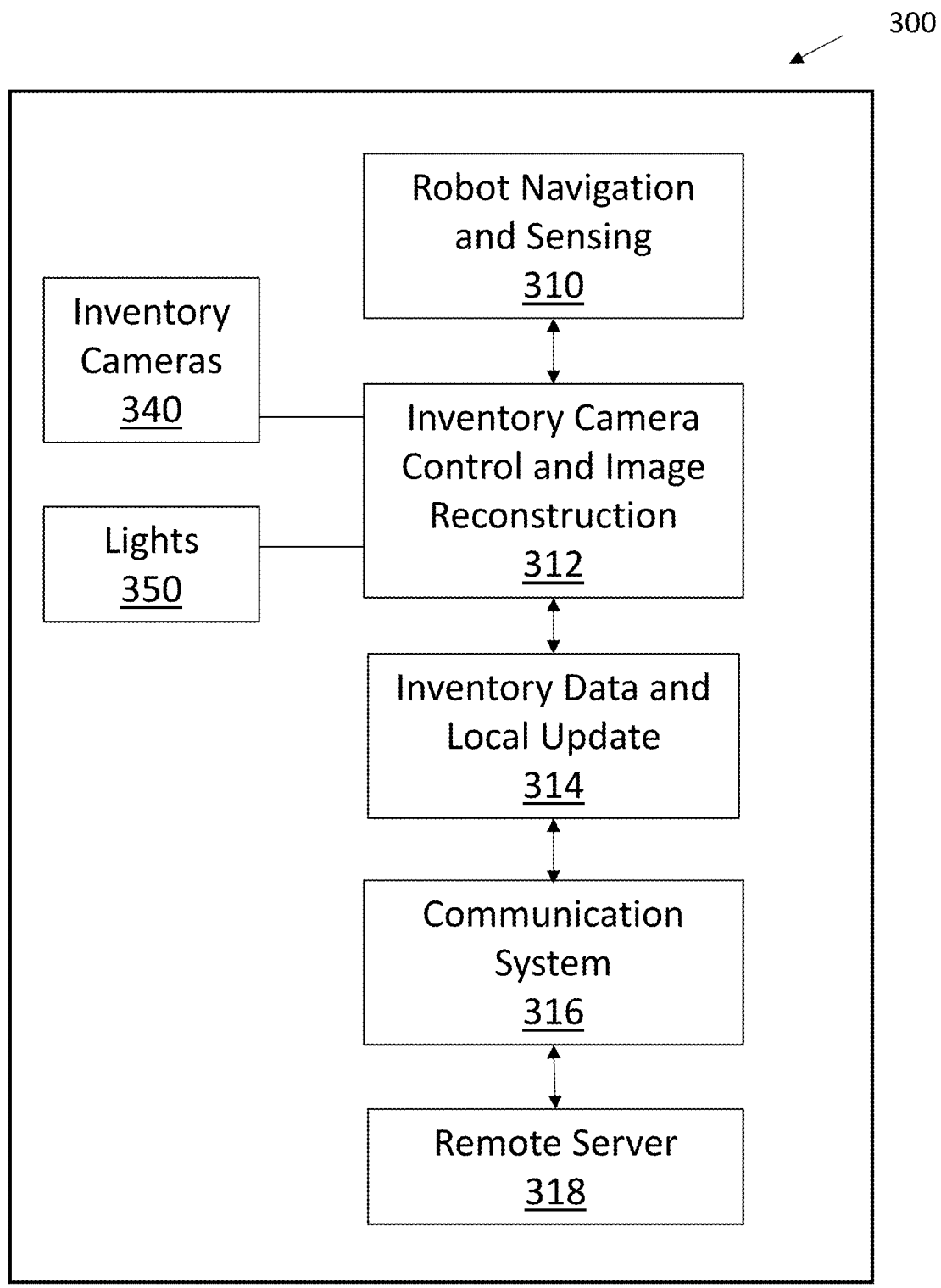
FIG. 3 is an illustration of various systems and electronic modules connected to inventory cameras.

FIG. 3 is an illustration of various systems and electronic modules 300 supported by an autonomous robot having robot navigation and sensing 310. Inventory cameras 340 are moved into a desired position with the aid of robot navigation and sensing module 310. Lights 350 are directed toward product inventory and inventory camera control and image reconstruction 312 takes a series of inventory photos (and optional depth measurements) that can be stitched together to help form or update a realogram. Panoramic images, realogram data, or other inventory related information is handled by an inventory data and local update module 314, which can transmit or receive relevant information via communication system 316. Data can be communicated to a server local to the store, or transmitted by suitable internet or networking devices to remote servers or cloud accessible data sites.

Inventory cameras 340 can include one or more movable cameras, zoom cameras, focusable cameras, wide-field cameras, infrared cameras, ultra-violet cameras, or other specialty cameras to aid in product identification or image construction. For example, a wide-field camera can be used to create an image organizing template into which data from higher resolution cameras with a narrow field of view are mapped or registered. As another example, a tilt controllable, high resolution camera positioned on the camera support roughly at a height of a shelf lip can be used to read shelf attached bar codes, identifying numbers, or labels. In certain embodiments, conventional RGB CMOS or CCD sensors can be used, alone or in combination with spectral filters that may include narrowband, wideband, or polarization filters. Embodiments can also include sensors capable of detecting infrared, ultraviolet, or other wavelengths to allow for hyperspectral image processing. This can allow, for example, monitoring and tracking of markers, labels or guides that are not visible to people, or using flashing light in the invisible spectrum that do not induce discomfort or health risk while reducing energy consumption and motion blur.

Lights can be mounted along with, or separately from, the sensors, and can include monochromatic or near monochromatic light sources such as lasers, light emitting diodes (LEDs), or organic light emitting diodes (OLEDs). Broadband light sources may be provided by multiple LEDs of varying wavelength (including infrared or ultraviolet LEDs), halogen lamps or other suitable conventional light source.

Various spectral filters that may include narrowband, wideband, or polarization filters and light shields, lenses, mirrors, reflective surfaces, diffusers, concentrators, or other optics can provide wide light beams for area illumination or tightly focused beams for improved local illumination intensity.

According to some embodiments, both cameras 340 and lights 350 can be movably mounted. For example, hinged, rail, electromagnetic piston, or other suitable actuating mechanisms used to programmatically rotate, elevate, depress, oscillate, or laterally or vertically reposition cameras or lights.

In still other embodiments, one or more of the cameras can be mounted in such a way as to take advantage of the rolling shutter effects and direction of travel of the autonomous robot. Aligning a camera in such a way as to take advantage of the "rasterized" delay of the rolling shutter can reduce artifacts (elongation/shortening) that can occur while the robot is traveling in its path.

Inventory data 314 can include but is not limited to an inventory database capable of storing data on a plurality of products, each product associated with a product type, product dimensions, a product 3D model, one or more product images and a current product price, shelf location, shelf inventory count and number of facings. Realograms captured and created at different times can be stored, and data analysis used to improve estimates of product availability. In certain embodiments, frequency of realogram creation can be increased or reduced.

The communication system 316 can include connections to either a wired or wireless connect subsystem for interaction with devices such as servers, desktop computers, laptops, tablets, or smart phones. Data and control signals can be received, generated, or transported between varieties of external data sources, including wireless networks, personal area networks, cellular networks, the Internet, or cloud mediated data sources. In addition, sources of local data (e.g. a hard drive, solid state drive, flash memory, or any other suitable memory, including dynamic memory, such as SRAM or DRAM) that can allow for local data storage of user-specified preferences or protocols. In one particular embodiment, multiple communication systems can be provided. For example, a direct Wi-Fi connection (802.11b/g/n) can be used as well as a separate 4G cellular connection.

Remote server 318 can include, but is not limited to servers, desktop computers, laptops, tablets, or smart phones. Remote server embodiments may also be implemented in cloud computing environments. Cloud computing may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Figure 4:
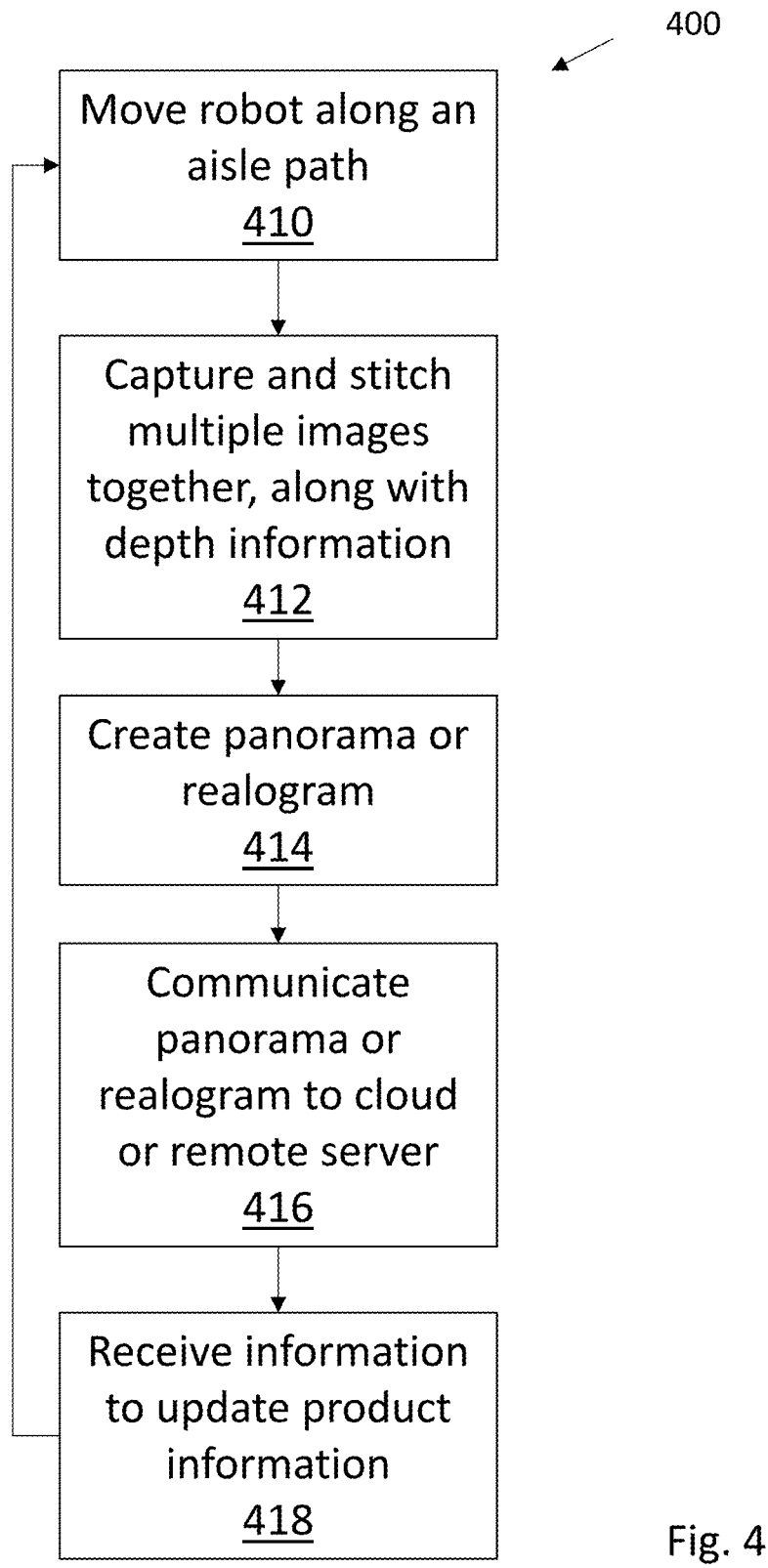
FIG. 4 is an illustration of steps in one embodiment of operation.

FIG. 4 is an illustration of realogram or panorama updating steps in one embodiment of operation. As seen in flow chart 400, a robot moves to an identified position and proceeds along an aisle path at a predetermined distance (step 410). If the path is blocked by people or objects, the robot can wait till the path is unobstructed, begin movement and slow down, wait as it nears the obstruction, move along the path until required to divert around the object before reacquiring the path, or simply select an alternative aisle.

In step 412, multiple images are captured and stitched together to define an image panorama. Optionally, in certain embodiments a panoramic or widefield camera can capture a single large image. These images, along with optional depth information created by a laser ranging system, an infrared depth sensor, or similar system capable of distinguishing depth at a decimeter or less scale, are used to create either panorama or a realogram (step 414). This information is communicated to a cloud or remote server (step 416) to create, change, or update a panorama and/or realogram with data derived from shelf labels, bar codes, and product identification databases to identify products. A realogram is created using panorama images and data, and can be used by, for example, store managers, stocking employees, or customer assistant representatives to localize product and label placement, estimate product count, count the number of product facings, or even identify or locate missing products. Additionally, in some embodiments, realogram or other information received from other robots, from updated product databases, or from other stores can be used to update or assist in the creation of subsequent realograms (step 418).

Figures 5A, 5B:
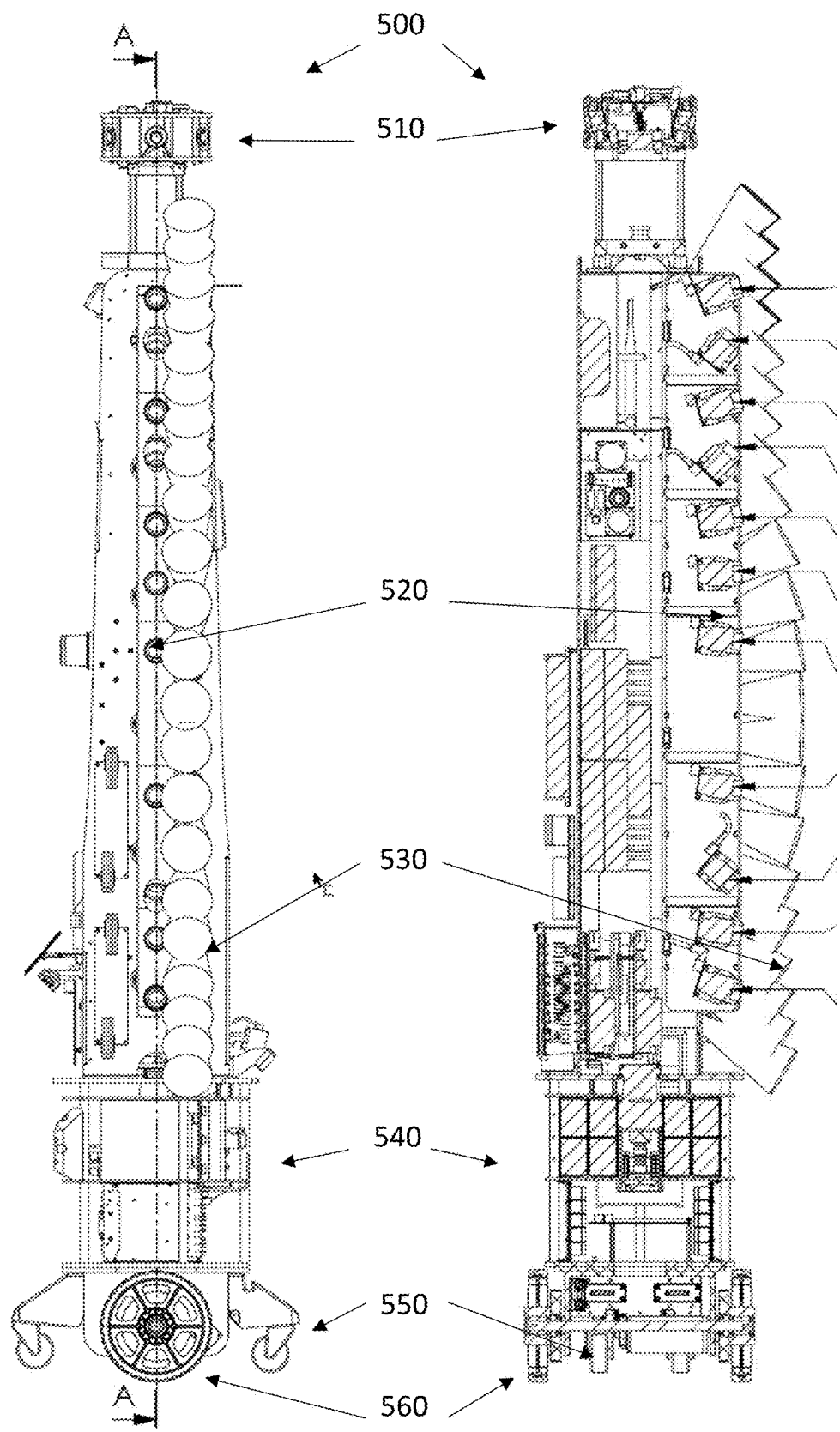
FIGS. 5A and B are respectively examples in side view and cross section of an autonomous robot capable of acting as a mobile base for a camera system.

FIGS. 5A and B are respectively examples in side view and cross section of an autonomous robot 500 capable of acting as a mobile base for a camera system in accordance with this disclosure. The robot navigation and sensing unit includes a top mount sensor module 510 with a number of forward, side, rear, and top mounted cameras. A vertically aligned array of lights 520 is sited next to a vertically arranged line of cameras 530, and both are supported by a drive base 540 that includes control electronics, power, and docking interconnects. Mobility is provided by drive wheels 560, and stability is improved by caster wheels 550.

Inventory monitoring can rely on use of autonomous robot camera system images. Typically, multiple images are processed, combined, and segmented for further analysis. Segmented images can assist in defining a product bounding box that putatively identifies a product facing. This information is often necessary to develop a product library. A segmented image can include multiple product bounding boxes, typically ranging from dozens to hundreds of outlined or distinct image areas. The bounding boxes can surround either product facings, groups of products, or gaps between products. Products within product bounding boxes can be manually identified, identified using crowd source or paid reviewer image identification systems, identified with or without the aid of an initial planogram, or automatically identified using various image classifiers discussed herein. Gaps between products are useful for identifying shelf spacings, product separation, or missing/absent inventory.

Automatic identification can be performed using an autonomous robot, alone or in combination with an external image classifier system. In certain embodiments, a product bounding box can be defined as the horizontal space on the shelf occupied by one or more copies (facings) of the same product, along with the vertical space spanning the distance between a current shelf and the shelf above it. When the current shelf is the top shelf, the vertical space is a number generally corresponding to the distance to top of the fixture. The vertical space can alternatively be top of the product as sensed by depth sensors.

Image segmentation to automatically assist in creation of product bounding boxes and product identification can rely on use of image templates in some embodiments. Typically, each image template is compared with the image captured by a camera system mounted on an autonomous robot. If a match is positive, the matched section of the image is used as the image segmentation for that product Segmentation can be improved by training classifiers on annotated training data sets, where bounding boxes are manually drawn around products. Training can be performed with supervised or unsupervised machine learning, deep learning, or hybrid machine and deep learning techniques, including but not limited to convolutional neural networks.

When a segmented product is identified, the real dimensions of the product are compared to the apparent dimensions of the product in the image to extract a distance estimate between the imaging sensor and the product. Additionally, the apparent position of the product in the image combined with the distance estimate enable the computation of the three-dimensional position and orientation between the imaging sensor and the product.

In yet another embodiment, methods that extract topological shelf positions for each product from the planogram can be utilized.

In other embodiments, RFID tags, wireless beacons, locators, or trackers can be used alone or in combination to assist in defining a product bounding box. For example, in some embodiments, an autonomous robot can be additionally equipped with one or more RFID readers. Performing an inventory count of products equipped with RFID tags can proceed in one embodiment as follows:

The total number of tags for each product is communicated by an inventory management software to an RFID reader mounted on or associated with an autonomous robot;

The RFID reader collects RFID tags while the autonomous robot is either stationary or moving;

If the RFID reader does not collect all the tags for a given product, and:

i) If the autonomous robot is moving, then the autonomous robot stops in an attempt to collect the remaining tags, or ii) If the autonomous robot is stopped, move the autonomous robot in a predetermined search path in an attempt to collect the remaining tags.

With suitable changes, Bluetooth, Near Field Communication, or other conventional wireless system can be used in place of RFID systems.

In some embodiments, visual images based on numeric, alphabetic, one or two-dimensional bar codes, or similar image based shelf or product labels can be used alone or in combination with various image features to segment images and assist in defining a product bounding box. Each shelf image can be analyzed and segmented to detect individual price tags or product labels on the shelf. Alternatively, or in addition, each image can be used to detect identifying indicia of individual products and product packages. Segmentation can use techniques that include but are not limited to:

Edge detection;
Depth estimation using depth estimation techniques that include but are not limited to:
  1. Stereo camera
  2. Structure from motion
  3. Structure from focus
  4. Depth camera using time of flight
  5. Depth camera using triangulation
  6. Planar or 3D laser/lidar scanner
Color segmentation;
Product features including but not limited to product shapes, colors, texts, and aspect ratios;
Product shapes identified and learned using machine learning techniques such as convolutional neural networks and deep learning
Association of individual product images to identifiers based on a location heuristic. The heuristic may locate the identifier below a product image or in another proximal location.

The heuristic may be informed from the planogram by correlating the planned location of labels to the measured location of labels, and the number of facings for each facing group with the measured distance between consecutive labels divided by the width of the product corresponding to the left label. These correlations can be optimized, for example by using graph theory approaches, to generate a maximum likelihood correspondence between a facing group and a label.

Association may also be informed by mapping the left most label on a shelf with the left most group of self-similar facings, the right most label on the same shelf with the right most label facing group, and working inward until every facing group has an associated label.

Further, association may be informed by classifiers trained on hand-annotated associations from training data sets and using heuristics similar to the ones described above. Some methods further include inferring the position of each identifier on the shelf by comparing the location of the identifier to the location of the beginning or end of the shelf on which the identifier is placed. Alternatively, methods can be based on inferring the position of each product on the shelf by comparing the location of the product to the location of the beginning or end of the shelf on which the product is placed.

In some methods, an identifier's shelf location and/or product location are expressed in metric terms, i.e. measured distance from the beginning or end of a specific shelf. In other methods, an identifier's shelf location and/or product location are expressed topologically, e.g. as a sequence of identifiers from the start or the end of a specific shelf, and from the bottom of a shelf to the top, or from top to bottom. For example, a specific identifier may be third from the start of the fourth shelf.

If a product library or classifier is created or made available, the products within the library can be indexed for improved searching performance and/or reduced storage requirements. Indexing methods include but are not limited to: hashing techniques, tree representations, and bag-of-words encodings. Alternatively, planogram information or product location information from the product library can be used to reduce the number of products that must be searched or use a classifier scoped to just those products contained within the imaged shelf. In still other variations, identified products can be verified by segmenting and decoding the price tag or product label located proximally to each identified product.

Figure 6:
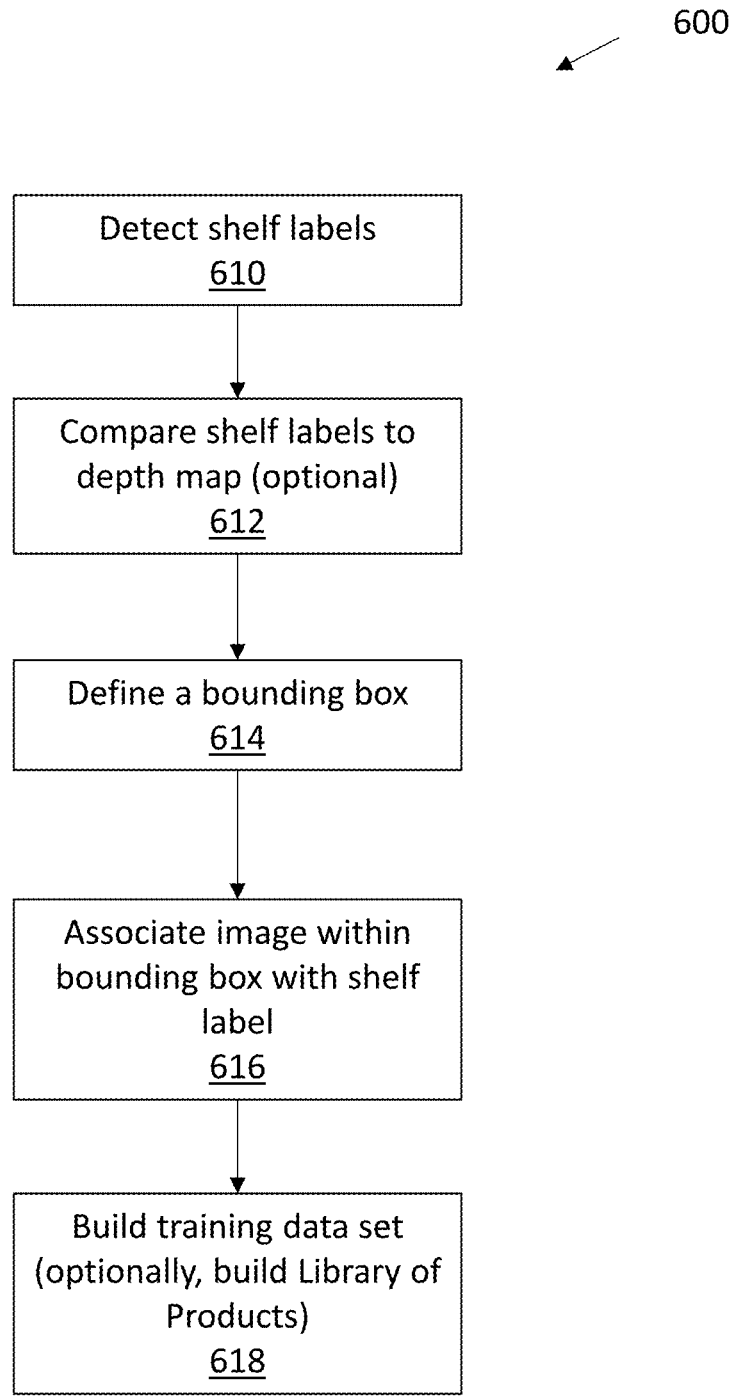
FIG. 6 is a flowchart 600 illustrating in more detail how a product space for a realogram can be created without requiring an initial planogram.

FIG. 6 is a flowchart 600 illustrating in more detail one example of how a product bounding box such as previously discussed can be created from information captured by sensor and camera system supported by an autonomous robot. Turning to FIG. 6, in a first step 610, shelf labels are detected either in individual shelf images, or in a stitched panorama. Classification algorithms such as convolution neural networks or other deep learning methods, template matching or HAAR cascades can be used to aid in detection of each shelf label. Each shelf label is analyzed to obtain one or more product identifiers. Analysis may include but is not limited to optical character recognition, bar code scanning, QR code scanning, AR code scanning, or hologram code scanning. Product identifiers may be UPC code, the product name, or a coded collection of letters, numbers, or other symbols. If more than one identifier is available, a preferred identifier such as the UPC code can be selected. In certain embodiments, infrared or ultraviolet detectable product identifiers embedded on product packaging or shelf labels can be used, as well as any other suitable tag, marker, or detectable identifying indicia such as a visible UPC code or serial number on the product packaging.

In optional step 612, an image location of the shelf label is registered or compared to a depth map to recover its 3D location in space. The depth map can be created by use of one or more depth sensors that infer depth from stereo images, project an infrared mesh overlay that allows rough determination of object distance in an image, infer depth from the time of flight of scanning lasers or LEDs reflecting off the target, a radar, or any other suitable method for building a depth map typically having sub-millimeter to sub-centimeter resolution.

In step 614 a bounding box is defined as a perimeter enclosing one or multiple facings of the same product, or any space on the shelf including but not limited a gap between products. The bounding box can be manually defined, or automatically defined using training classifiers, deep learning, image segmentation, or any other suitable technique or combination of techniques. A bounding box can be created with reference to labels grouped by height, with a horizontal distance between adjacent labels used to define the width of the bounding box for single facing products. For multiple facing products, the bounding box width is subdivided in sections equal to the product width.

The height of the bounding box can be derived from the detection of shelf heights. Shelf heights can be detected by analyzing the depth map to identify horizontal indentations corresponding to the distance between the bottom of a shelf and products stacked below it. These horizontal indentations correspond to shelf lips and measure shelf height.

Alternatively, label groups can be filtered by horizontal span (defined as the horizontal distance between the first and last label of the group) according the following criteria:
  i) A label group passes the filter if its horizontal span overlaps with the current label group span.
  ii) A label group passes the filter if its horizontal span is distant from the current label group span by no more than a number representing a bay width. Generally, bay widths are standard three or four-foot-wide shelves used throughout a store.
  iii) Order filtered label groups by height and select the label group that is next highest after the current label group.

Alternatively, shelf heights can also be detected by deep learning classifiers trained on manually annotated color and depth images (if available) of the shelves.

The height of the bounding box can be fully defined once the height difference between the selected label group and the current label group is determined.

For vertically stacked products, the height of the bounding box is subdivided in sections equal to the height of the product.

In certain embodiments, the previous method for determining the bounding box can be probabilistically combined through estimating a confidence measure for each method and adding their results.

Next, in step 616, each bounding box is consistently associated with an identifier based on a label location heuristic. The identifier can be selected to originate from either the left or the right shelf label. The association of bounding boxes and identifier can further be refined through optimization across an entire shelf section or aisle. The bounding box, with identifiers, can be registered to a simple or panoramic stitched image of the shelf, and image descriptors extracted for the portion of the image contained in the bounding box. Methods for generating image descriptors include but are not limited to: image templates, Histogram of Gradients, Histogram of Colors, the Scale Invariant Feature Transform, Binary Robust Independent Elementary Features, Maximally Stable Extremal Regions, Binary Robust Invariant Scalable Keypoints, Fast Retina Keypoints, Kaze features, and variations thereof.

An alternative to extracting product descriptors is to use the bounding boxes as labeled categories and train classifiers on the images contained in the bounding boxes. Classifiers may include those based on deep structured learning, hierarchical learning, deep machine learning, or other suitable deep learning algorithms associated with convolutional, feedforward, recurrent, or other suitable neural network. A deep learning based classifier can automatically learn image descriptors based on an annotated training data. For example, deep learning based image descriptors can be hierarchical, corresponding to multiple layers in deep convolutional neural networks. The final layer of a convolutional layer network outputs the confidence values of the product being in one of the designated image categories. The image descriptor generator part and the classification part get integrated in a convolutional neural network and these two parts are trained together using a training set.

Alternatively, or in addition, embodiments that use both deep learning based image descriptors and conventional image descriptors can be combined in a hybrid system.

In step 618, the image descriptors can be classified and labelled with the identifier. Classification algorithms that can include but are not limited to support vector machine. This process can be repeated for every image of the bounding box associated to the same identifier, whether the image is captured in the same store at different times, or in different stores. In time, this allows automatically building a product library (i.e. the "Library of Products"), without requiring an initial planogram or storage of specific product databases.

For those embodiments utilizing deep learning based image descriptors, the neural network classifier can be part of the same trained convolutional neural network. The automatically learned features, which are extracted from different layers of the convolutional neural network, can be used in a larger product recognition system. These features can be used in conjunction with other classifiers or with conventional image descriptors in a hybrid system.

For many applications, product and product label identification require more sophisticated processing steps to meet conditions related to available time, limited local memory, and data transfer to cloud limitations. For example, in a typical store aisle product monitoring application, a single aisle may require 4000 high resolution pictures to be combined into one or more panoramas. Each panorama must be created in the space of seconds, and can require the processing of gigabytes of information at a time. Hundreds or thousands of products need identification, and critical data must be transmitted to local or cloud servers in a matter of minutes. Methods are needed to improve data handling efficiency by reducing gigabytes of raw image data to megabytes of useful data, using onboard RAM and a limited number of costly solid state flash memory systems.

Figure 7:
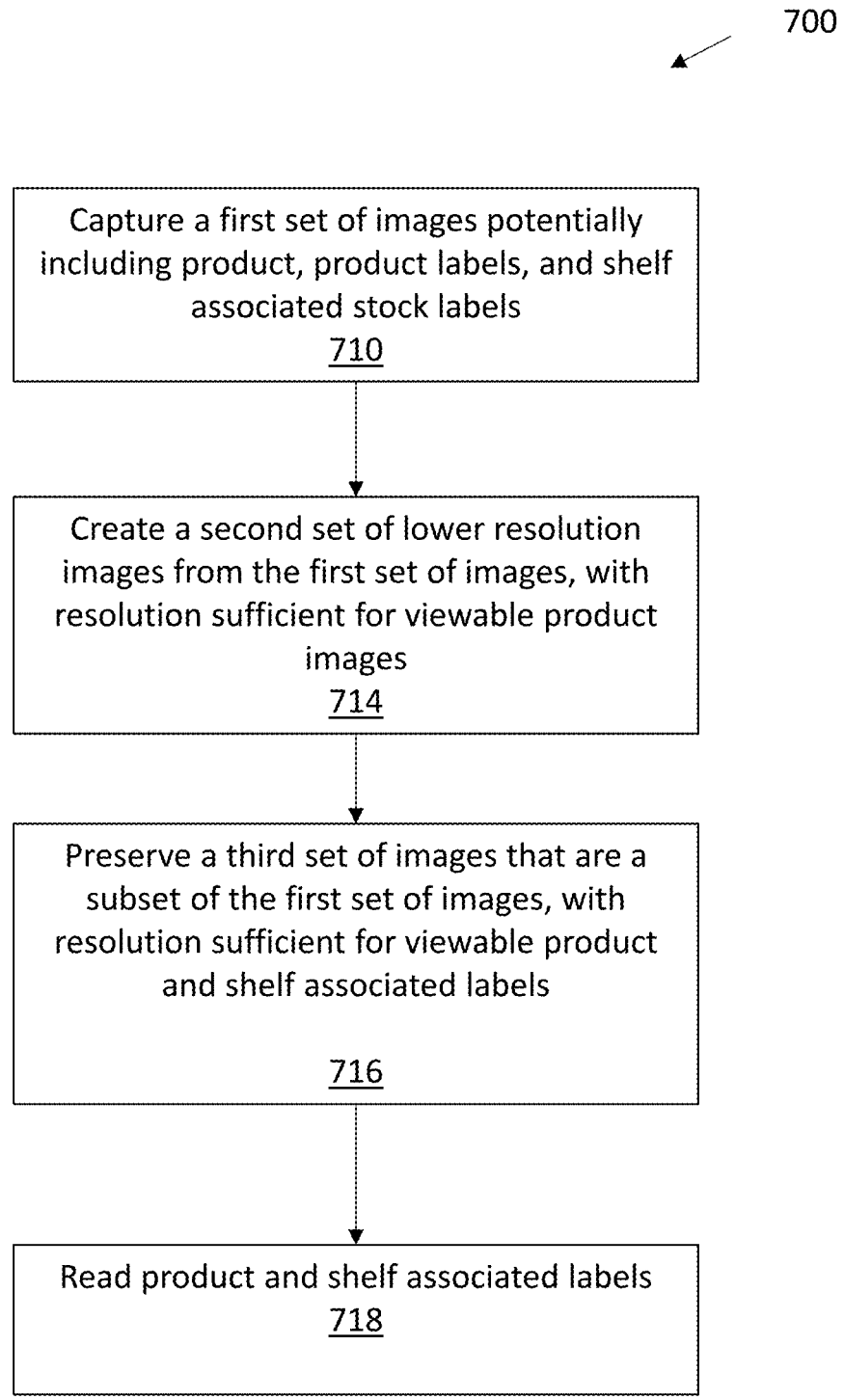
FIG. 7 is a flow chart 700 illustrating a method for data efficient processing.

FIG. 7 illustrates one embodiment of data efficient, inventory monitoring method 700 useful in conjunction with the previously described autonomous robots. Typically, an autonomous robot is directed or allowed to move along the aisle comprising product, product labels, and shelf associated stock labels, with the autonomous robot acting as a movable base having multiple cameras for image capture, and depth sensors useful for detecting shelf edges. In step 710, a first set of images of an aisle comprising product, product labels, and shelf associated stock labels is captured. In step 714, a second set of images derived from the first set of images and having a lower resolution than the first set of images is created. Resolution is selected so that product images are viewable, and have sufficient details to allow for automated or manual identification of the products. In step 716, a third set of images that are a subset of the first set of images is preserved. This third set of images has a higher resolution than the second set of images, and resolution is selected so that product labels and shelf associated stock labels are readable by automated or manual systems.

In some embodiments, position of product labels and shelf associated stock labels can be detected from the second set of images, while content of product labels and shelf associated stock labels is read using the third set of images. Advantageously, memory requirements can be greatly reduced by discarding the first set of images after creating the second and third set of images. In other embodiments, memory and processing requirements can be reduced by creating a panoramic image from the resolution reduced second set of images, rather than the original high resolution images. In still other embodiments, either or both of the second and third set of images can be sent to cloud storage for automated or manual analysis. In yet another embodiment, stitching the second image set, detecting product labels and reading their content in RAM memory can be completed before an image is discarded, saved to solid state disk, or communicated to an external cloud server.

Local (on the autonomous robot) or remote (e.g. external cloud) analysis can include automated or manual definition of one or more bounding boxes around product labels and shelf associated stock labels to identify respective position in the second and first set of images. Bounding boxes can be associated to products as previously discussed with respect to FIG. 6.

In other embodiments of the method described with respect to FIG. 7, product labels and shelf associated stock labels can be automatically or manually detected and read. In some embodiments, position and content of shelf associated stock labels can be maintained in a data history to improve future identification efforts. Labels can include, but are not limited to one or two-dimensional bar codes or watermarks.

Accurate detection of shelf associated stock labels is necessary for utilizing the described method of FIG. 7. In one embodiment, position of shelf associated stock labels can be identified through characteristic color discontinuity between the labels and the shelf edges. Alternatively, or in addition, position of shelf associated stock labels can be detected by background subtraction or edge discontinuity. More sophisticated position identifying methods using machine intelligence or neural network methods can involve detection with classifiers trained on shelf associated stock labels, or use of Haar classifiers trained on shelf associated stock labels. These detection efforts can optionally include a data history of label position and content.

For some applications, shelf associated stock labels may not be available. This is particularly true for inventory stored on a top shelf, or temporary displays or product positioned away from the shelf on endcaps or in standalone displays. In this situation, high resolution images of shelf inventory not having shelf associated stock labels is captured, and product identification occurs using only the product image. Typically, high resolution images can capture bar codes, product names, or other identifiers printed and visible on the product box or container.

Figure 8:
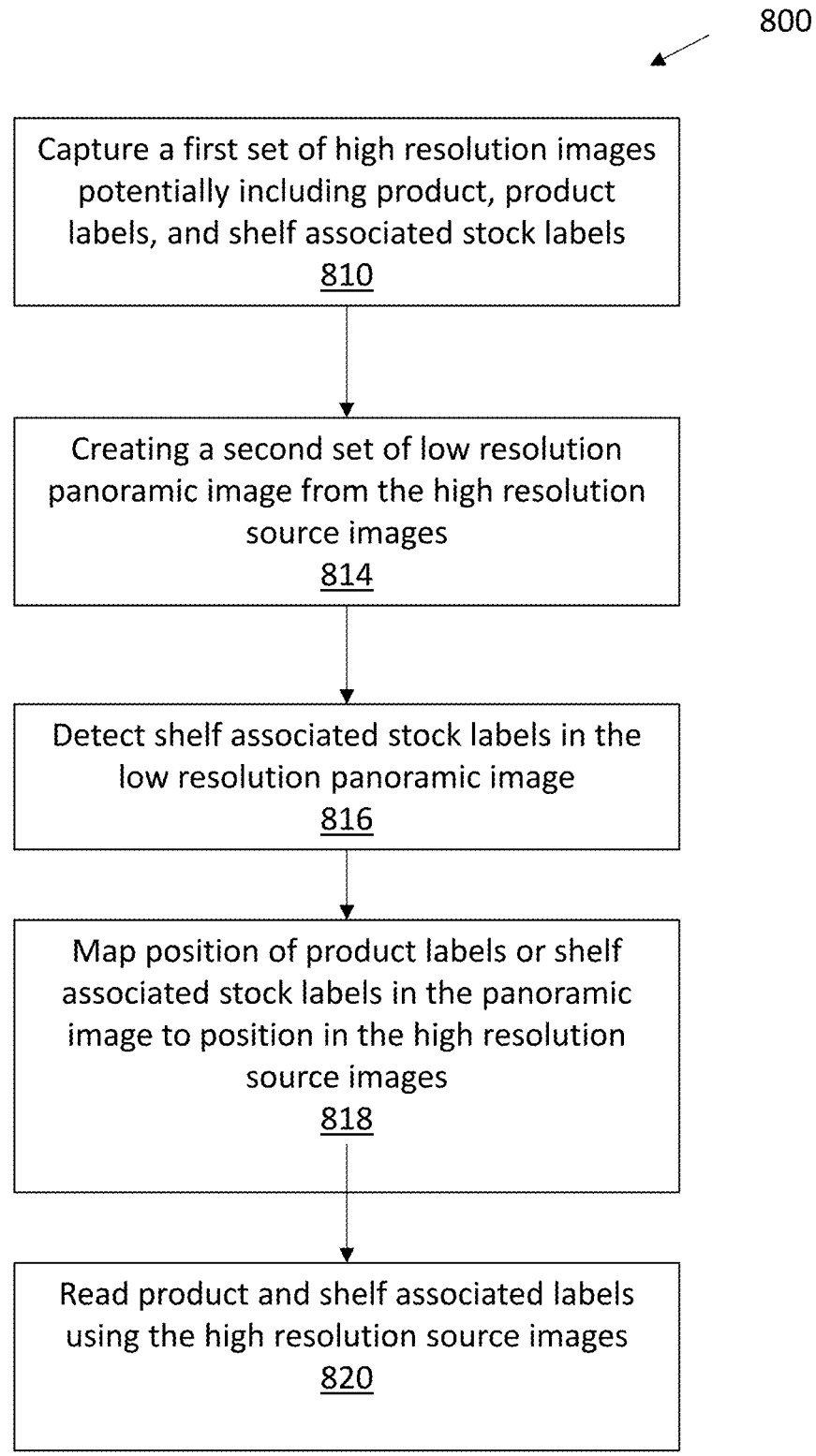
FIG. 8 is a flow chart 800 illustrating another method for data efficient processing.

FIG. 8 illustrates another embodiment of an inventory monitoring method 800 useful in conjunction with the previously described autonomous robots. High resolution source images of an aisle comprising product, product labels, and shelf associated stock labels are captured in a first step 810. In step 814 a low resolution panoramic image is created from the high resolution source images. In step 816, shelf associated stock labels in the low resolution panoramic image are detected. In step 818, position of product labels or shelf associated stock labels in the panoramic image is mapped to corresponding position in the high resolution source images. This permits, in step 820, reading product labels or shelf associated stock labels directly using the high resolution source images, or from images derived from the high resolution source images. In some embodiments, the step of creating a low resolution panoramic image from the high resolution source images further includes combining at least multiple adjacent pixels (e.g. two pixels) into a single pixel, allowing reverse addressing to map position of product labels or shelf associated stock labels.

Figure 9:
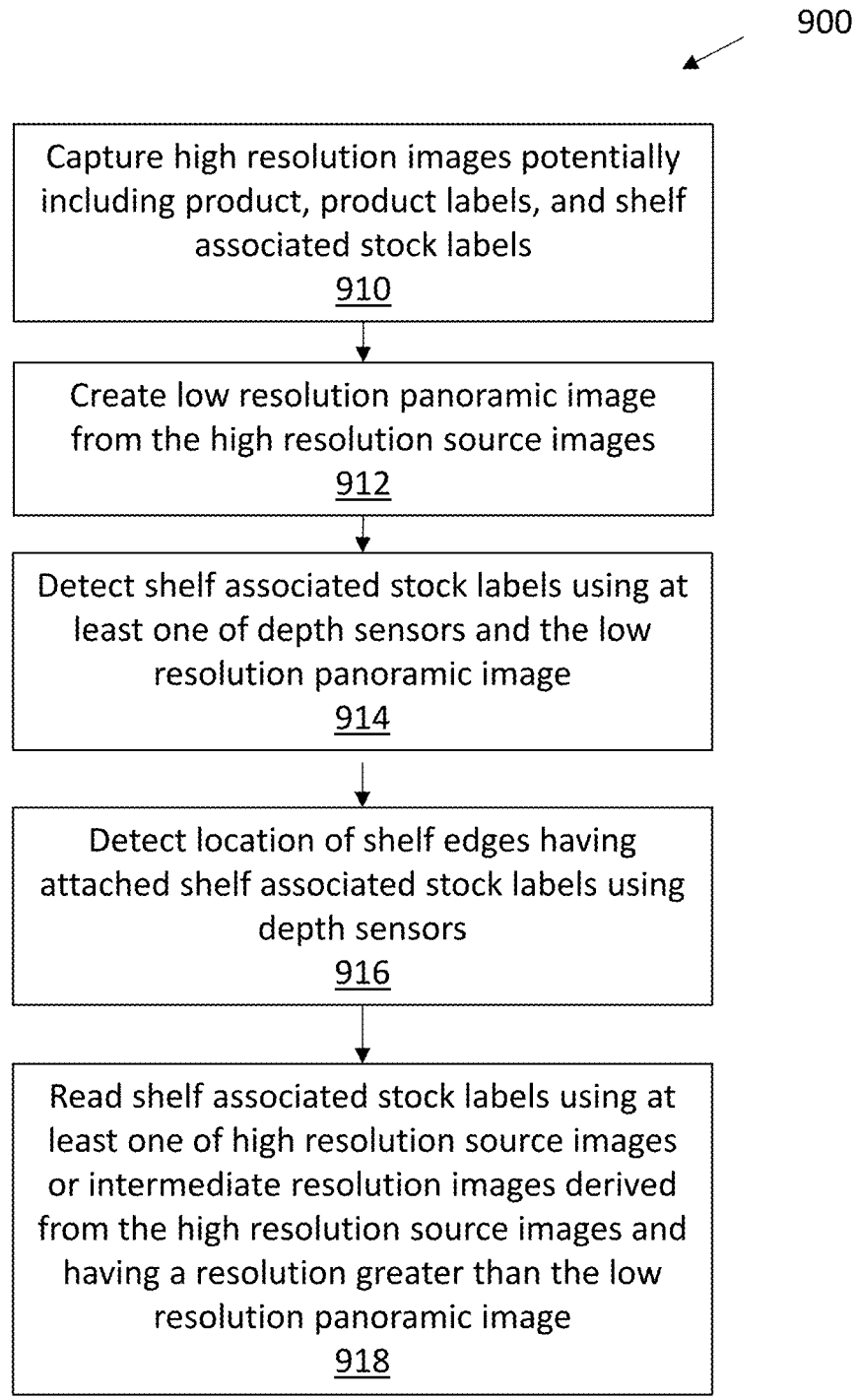
FIG. 9 is a flow chart 900 illustrating another method for data efficient processing using shelf edge detection with depth sensors.

Speedy identification of shelf edges that support shelf labels is useful. As disclosed with respect to FIG. 9, an alternative inventory monitoring method 900 can include a step 910 of capturing high resolution source images of an aisle comprising product, product labels, and shelf associated stock labels. In step 912, a low resolution panoramic image from the high resolution source images is created. In step 914, location of shelf edges having attached shelf associated stock labels is detected, and least in part using depth sensors. In step 916, shelf associated stock labels are detected using at least one of depth sensors and the low resolution panoramic image. Finally, in step 918 the shelf associated stock labels are read using at least one of high resolution source images or intermediate resolution images derived from the high resolution source images and having a resolution greater than the low resolution panoramic image. In some embodiments, location of shelf edges having attached shelf associated stock labels can be determined at least in part using previously detected location history. In other embodiments, location of shelf edges having attached shelf associated stock labels is determined using previously detected location history, with areas marked for subsequent detection if shelf edge location is not confirmed.

In some embodiments, both the image processing steps of capturing high resolution source images of an aisle comprising product, product labels, and shelf associated stock labels; and creating a low resolution panoramic image from the high resolution source images; are performed in memory before an image is saved to disk or external cloud. In other embodiments, the step of reading shelf associated stock labels is performed in memory before an image is saved to disk, external cloud, or discarded.

Figure 10:
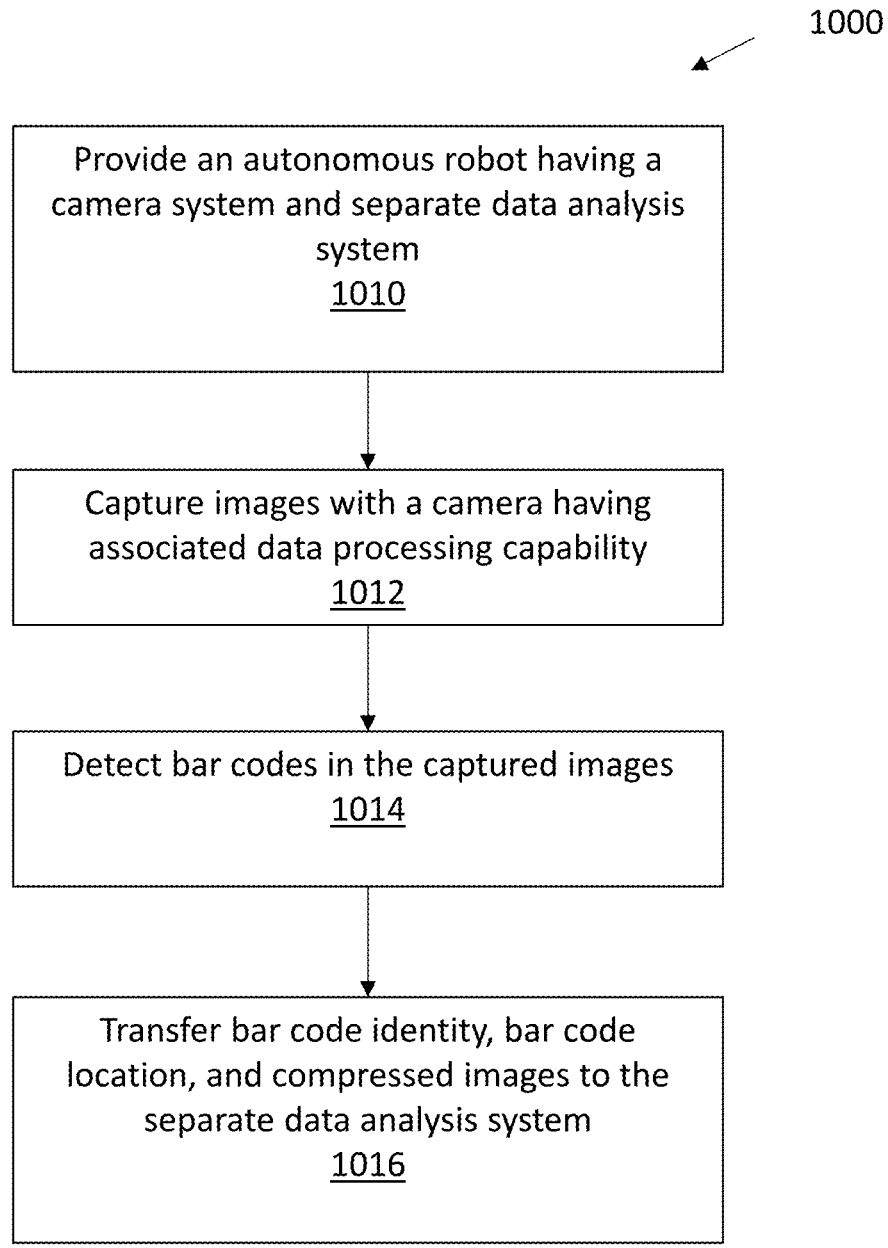
FIG. 10 is a flow chart 1000 illustrating a method for reading bar codes.

FIG. 10 is a flowchart 1000 relating to an inventory monitoring method. In step 1010, an autonomous robot having a camera system and a separate data analysis system is provided. In step 1012, images are captured with a camera having associated data processing capability. In step 1014, one or two dimensional bar codes are detected in the captured images. In step 1016*m* bar code identity, bar code location, and compressed images are transferred to the separate data analysis system. In some embodiments, the data analysis system provides the camera having associated data processing capability with shelf edge location information. This allows the camera to transfer uncompressed images corresponding to shelf edge location back to the separate data analysis system. In other embodiments, the camera can take a first image having a region of interest corresponding to shelf edge location, with the region of interest being transferred in uncompressed form back to the separate data analysis system. This allows the camera to take a second image that is compressed before transfer to the separate data analysis system.

Figure 11:
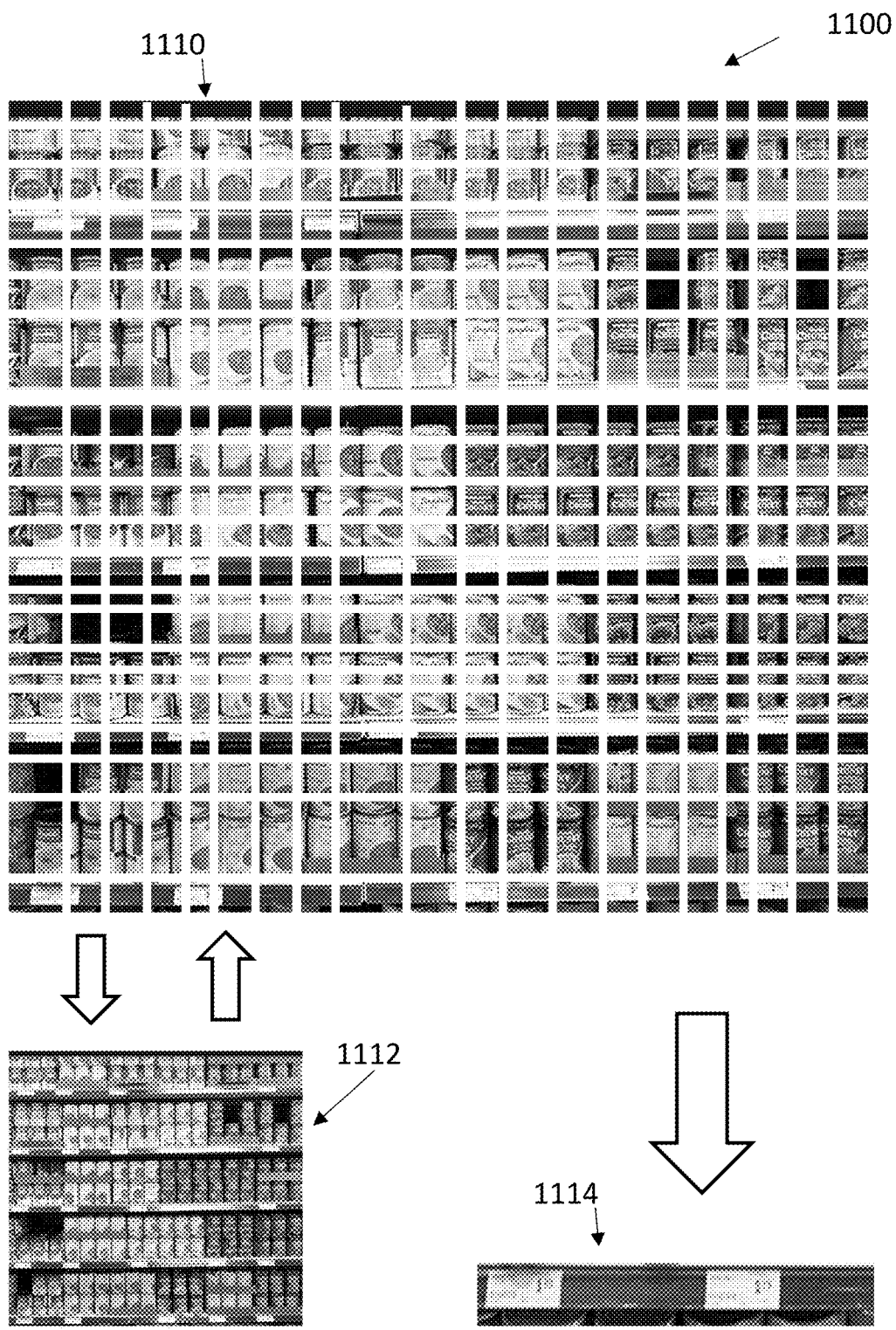
FIG. 11 is a cartoon illustrating various store aisle product images.

FIG. 11 is a cartoon illustrating image compression techniques in accordance with the previously described methods. Images 1100 can include product, product labels, and shelf associated stock labels. A series of high resolution images 1110 can be combined into a low resolution panorama 1112. Resolution of the panorama is selected to be sufficient for various product or label identification tasks, including human or machine identification of labels with bounding boxes. By reverse mapping, identified labels (for example) in the panorama can be mapped to the originating high resolution image 1110, and stored for further processing as image 1114. The high resolution images 1110 can then be deleted, with further human or machine processing using only the reduce data from panorama 1112 and label images 1114.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims. It is also understood that other embodiments of this invention may be practiced in the absence of an element/step not specifically disclosed herein.

The invention claimed is:

1. An inventory monitoring method, comprising:
capturing a first set of images of an aisle comprising products, product labels, and shelf associated stock labels, wherein the first set of images comprises a plurality of first images;
creating a second set of images derived from the first set of images and having a lower resolution than the first set of images, wherein resolution of the second set of images is selected so that the second set of images are viewable for detecting positions of the product labels and the shelf associated stock labels;
creating one panoramic image from the second set of images, wherein the second set of images comprises a plurality of second images, and the second set of images is derived by combining at least two adjacent pixels of the first set of images into a single pixel, allowing reverse mapping of the positions of the product labels and the shelf associated stock labels in the one panoramic image to corresponding positions of the product labels and the shelf associated stock labels in the plurality of first images;
identifying the positions of the product labels and the shelf associated stock labels in the one panoramic image;
reverse mapping the positions of the product labels and the shelf associated stock labels to the first set of images; and
creating a third set of images based on reverse mapping results, wherein the third set of images is a subset of the first set of images having a higher resolution than the second set of images, and resolution of the third set of images is selected so that the product labels and the shelf associated stock labels are readable for reading content of the product labels and the shelf associated stock labels using the third set of images.

2. The inventory monitoring method of claim 1, further comprising:
detecting, from the second set of images, the positions of the product labels and the shelf associated stock labels; and
reading content of the product labels and the shelf associated stock labels using the third set of images, based on the detected positions of the product labels and the shelf associated stock labels.

3. The inventory monitoring method of claim 1, further comprising discarding the first set of images after creating the second and third set of images.

4. The inventory monitoring method of claim 1, further comprising sending at least one of the second and third set of images to cloud storage for analysis.

5. The inventory monitoring method of claim 1, further comprising defining one or more bounding boxes around the product labels and the shelf associated stock labels to identify position in the second or third set of images.

6. The inventory monitoring method of claim 1, wherein the product labels and the shelf associated stock labels further comprise a bar code.

7. The inventory monitoring method of claim 1, wherein the product labels and the shelf associated stock labels are automatically detected and read.

8. The inventory monitoring method of claim 1, wherein the product labels and the shelf associated stock labels are manually detected.

9. The inventory monitoring method of claim 1, further comprising identifying shelf associated stock labels positioned on a shelf edge at least in part from history.

10. The inventory monitoring method of claim 1, further comprising stitching the second set, detecting labels and reading their content in memory before an image is saved to disk, external cloud or is discarded.

11. The inventory monitoring method of claim 1, further comprising detecting, by color discontinuity, the position of shelf associated stock labels.

12. The inventory monitoring method of claim 1, further detecting, by background subtraction, the position of shelf associated stock labels.

13. The inventory monitoring method of claim 1, further comprising detecting, by edge discontinuity, the position of shelf associated stock labels.

14. The inventory monitoring method of claim 1, further comprising detecting, by classifiers trained on shelf associated stock labels, the position of shelf associated stock labels.

15. The inventory monitoring method of claim 1, further comprising detecting, by Haar classifiers trained on shelf associated stock labels, the position of shelf associated stock labels.

16. The inventory monitoring method of claim 1, further comprising capturing high resolution images of shelf inventory not having shelf associated stock labels.

17. The inventory monitoring method of claim 1, further comprising:
detecting, by classifiers trained on the product labels, the positions of the product labels; and
reading the product labels.

18. The inventory monitoring method of claim 1, further comprising allowing an autonomous robot to move along the aisle comprising the products, the product labels, and the shelf associated stock labels, with the autonomous robot acting as a movable base capable of autonomously capturing the first set of images.

19. The inventory monitoring method of claim 1, further comprising allowing an autonomous robot to move along the aisle comprising the products, the product labels, and the shelf associated stock labels, with the autonomous robot acting as a movable base having multiple cameras and a depth sensing system.

20. The inventory monitoring method of claim 1, wherein the one panoramic image is created by first vertically stitching, and then horizontally and incrementally stitching the plurality of second images.

\* \* \* \* \*